United States Patent

[11] 3,612,750

| [72] | Inventors | Michael J. Monico<br>Dalton;<br>Louis B. Casucelli, North Adams, both of Mass. |
|---|---|---|
| [21] | Appl. No. | 5,729 |
| [22] | Filed | Jan. 26, 1970 |
| [45] | Patented | Oct. 12, 1971 |
| [73] | Assignee | General Electric Company |

[54] CABLE-CONNECTING ADAPTOR FOR HIGH VOLTAGE BUSHING OF A PAD-MOUNTED TRANSFORMER
3 Claims, 5 Drawing Figs.

[52] U.S. Cl............................................. 174/145, 339/242, 339/263 R
[51] Int. Cl...................................................... H01b 17/00
[50] Field of Search........................................... 174/18, 31 R, 145, 152 R, 153 R, 169; 339/31 R, 32 R, 242, 248 R, 248 S, 263 R

[56] References Cited
UNITED STATES PATENTS

| 2,068,314 | 1/1937 | Dotterer........................ | 339/248 S |
| 2,158,002 | 5/1939 | Douglas......................... | 339/242 |
| 2,250,210 | 7/1941 | Smith, Jr. ...................... | 174/145 X |
| 3,414,868 | 12/1968 | Howe ............................. | 174/145 X |

FOREIGN PATENTS

| 22,690 | 4/1930 | Australia...................... | 339/242 |
| 401,773 | 1/1943 | Italy .............................. | 339/242 |

Primary Examiner—Laramie E. Askin
Attorneys—Francis X. Doyle, Vale P. Myles, Frank L. Neuhauser, Oscar B. Waddell and Joseph B. Forman ABSTRACT: An adapter for the high-voltage bushing of a pad-mounted transformer to convert such bushing to a two-cable hot line tap. The adapter includes a first vertical slotted portion fitting the bushing cable connector and has a second vertical portion at right angles to the first vertical portion with a pair of slots on opposite ends of the second portion which will accept cable terminal connectors for securing cables to the adaptor.

PATENTED OCT 12 1971 3,612,750

Inventors,
Michael J. Monico,
Louis B. Casuscelli,
by Francis X. Doyle
Their Attorney.

CABLE-CONNECTING ADAPTOR FOR HIGH VOLTAGE BUSHING OF A PAD-MOUNTED TRANSFORMER

BACKGROUND OF THE INVENTION

This invention relates to bushing adapters and more particularly to an adapter for the high-voltage bushing of a pad-mounted transformer to enable a pair of cables to be connected to a single bushing.

In the distribution of electrical energy, increased use is being made of pad-mounted transformers in various distribution systems. These pad-mounted distribution transformers are frequently connected in a distribution system referred to as a "loop feed" system. In a loop feed system, a plurality of distribution transformers are connected in an open loop to a source of electrical energy. In this type of system, most of the distribution transformers are provided with two energized power lines. Thus, when one distribution transformer or a section of the connecting cable between transformers develops a fault requiring removal, the remaining equipment in the loop can still be energized. Obviously a loop feed system requires that each transformer be provided with connecting means to enable a pair of energized cables to be connected thereto. However, many pad-mounted distribution transformers are made with a single high-voltage bushing. It is thus necessary that such pad-mounted transformers be provided with an adapter or connecting means to enable them to be used in a loop feed system.

There is presently available a bracket device which may be secured to a single bushing to allow its conversion to a pair of energized power lines. This device has an opening for securing the bracket to the cable connection of the high-voltage bushing. A problem arises with this device in that it is necessary that the single bushing of the pad-mounted transformer be rotated through approximately 90° to allow the bracket to be used. As is well understood in liquid-filled pad-mounted transformers, the liquid-filled casing is sealed to prevent the entry of moisture or other contaminants which might affect the insulation value of the liquid. It is undesirable to rotate the bushing since such rotation may inadvertently allow leakage of the liquid or allow entry of contaminants to the liquid, or both may occur.

It is, therefore, one object of this invention to provide an adapter for the high-voltage bushing of a pad-mounted transformer to allow a pair of cables to be connected to such bushing.

A further object of this invention is to provide an adapter for the high-voltage bushing of a pad-mounted transformer which will connect to such bushing without moving or rotation of the bushing.

A still further object of this invention is to provide an adapter for the high-voltage bushing of a pad-mounted transformer which will connect to the cable connection of the bushing in the normal position of the connection and provide a pair of connection means for energized cables below such cable connection.

SUMMARY OF THE INVENTION

Briefly, this invention in a preferred form comprises an adapter bracket for the high-voltage bushing of a pad-mounted transformer. The adapter includes a first vertical member having means for attachment to the cable connector of the bushing and has a second vertical member at right angles to such first member and is provided with connection means for connecting a pair of energized cables to such adapter.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of a preferred embodiment thereof particularly when considered in the light of the accompanying drawing.

DESCRIPTION OF PREFERRED EMBODIMENT

Figure 5:
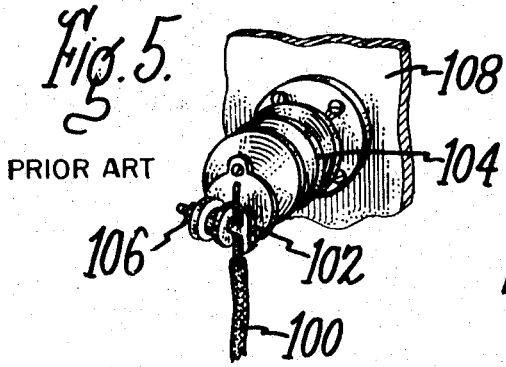
FIG. 5 is a perspective view on a reduced scale showing the normal high-voltage bushing of a pad-mounted transformer and the means of connecting a cable to such bushing.

In the preferred form of this invention, a high-voltage bushing adapter is provided which fits the normal position of the bushing cable connector and provides cable connector means for a pair of energized cables below the high-voltage bushing. As is well known to those skilled in the electrical energy distribution field, pad-mounted transformers are normally used with an underground distribution system. In this system, the high-voltage cable comes underground to the pad-mounted transformer. It is then brought into the high-voltage compartment from the ground directly up to the high-voltage bushing. See, for example, U.S. Pat. No. 3,365,540. The high-voltage bushing is usually provided with an eyebolt connector normally having a hole therethrough. The cable is stripped and the bare wire inserted into such hole. The eyebolt connector is then tightened to clamp the bare wire of the high-voltage cable to such bushing. This is shown for example in FIG. 5 wherein is seen the cable 100 with the stripped wire clamped in the eyebolt connector 102 on the high-voltage bushing 104 by the nut 106.

Figure 1:
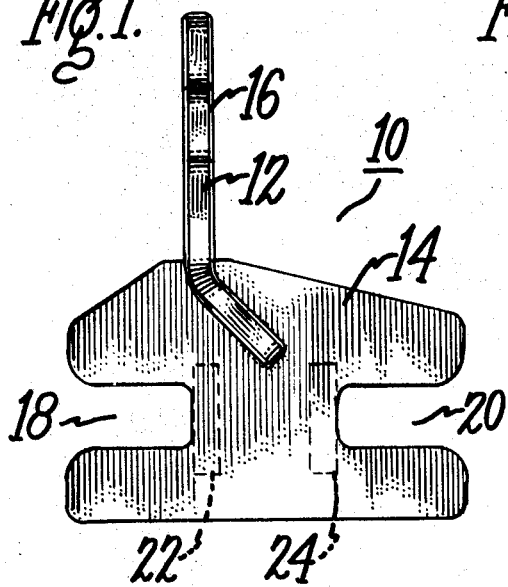
FIG. 1 is a front view of a preferred form of bushing adapter according to this invention.
Figure 2:
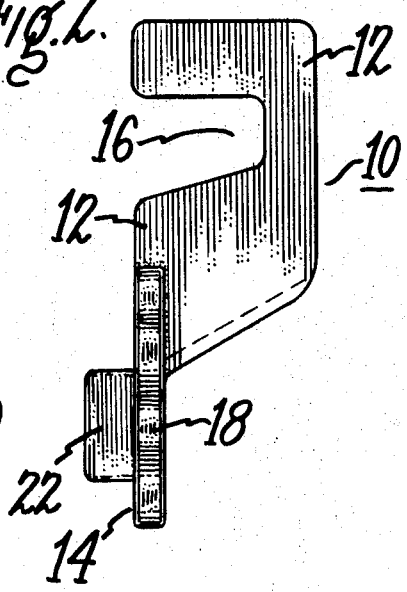
FIG. 2 is a side view of the adapter shown in FIG. 1.
Figure 3:
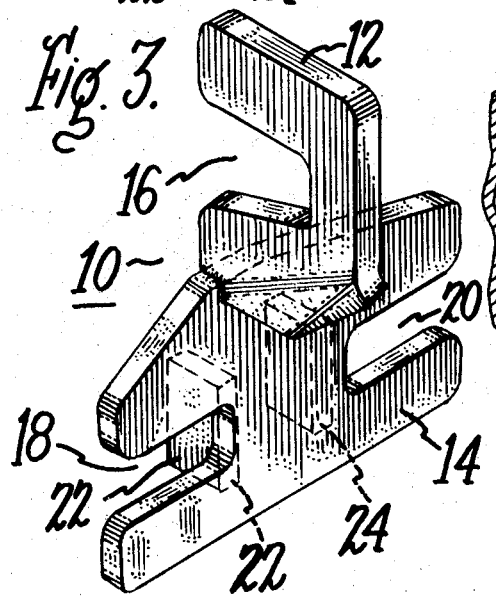
FIG. 3 is a perspective view of the adapter shown in FIG. 1.
Figure 4:
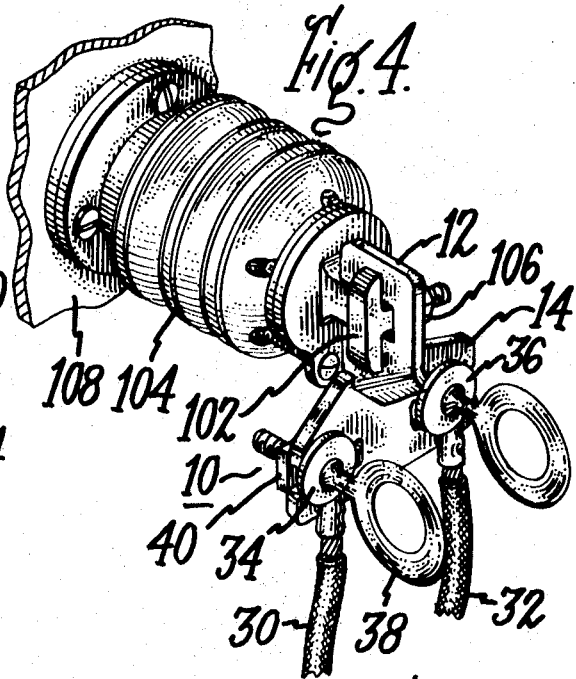
FIG. 4 is a perspective view on a reduced scale of the adapter of this invention mounted on a high-voltage bushing and having a pair of cables connected thereto.

The preferred form of bushing adapter is shown in FIGS. 1 through 3 while the connection of such adapter to the high-voltage bushing is shown in FIG. 4. Referring first to FIGS. 1 through 3, the adapter 10 is shown as an integral conductive member having an upper portion 12 and a lower portion 14. The upper portion 12 is in a first vertical plane while the lower portion 14 is in a second vertical plane which is at a right angle to the vertical plane of the upper portion 12. The upper vertical portion 12 in the preferred form is provided with a slot 16 which is adapted to be secured to the eyebolt connector of a high-voltage bushing. The second vertical portion 14 in the preferred form has a pair of slots 18 and 20 at opposite ends. Also, formed on the portion 14 are two lock members 22, 24. As is shown, lock members 22 and 24 are preferably formed in vertical planes parallel to the vertical plane of portion 12 and are formed on portion 14 at the inside edge of slots 18 and 20, respectively.

FIG. 4 shows the adapter of this invention secured to the high-voltage bushing of a pad-mounted transformer. As can be seen in FIG. 4, the high-voltage bushing 104 is mounted on a wall 108 forming part of a pad-mounted transformer (not shown). The cable eyebolt connector 102 is normally in the position shown to receive the high-voltage cable in the manner shown particularly in FIG. 5. Slot 16 of the vertical portion 12 of adapter 10 fits over the connector 102 and may be secured thereon by tightening of nut 106. Portion 14 of the adapter 10 is thereby mounted below the bushing 104 and positioned so as to receive a pair of high-voltage cables. As is shown, the high-voltage cables 30 and 32 may be provided with terminal connectors 34, 36, respectively. Thus, cable 30 may be slipped into the slot 18 and tightened in such slot by turning the eye 38. As will be understood, a nut 40 on connector 34 will rest against the lock member 22 which prevents nut 40 from turning. Obviously, terminal connector 36 is secured in slot 20 in a similar manner. From the above, it will be apparent that by means of the adapter of this invention there is provided an adapter which may be secured to the connector of a bushing without rotation of such bushing. Of course, it will be obvious to those skilled in the transformer art that this invention may be readily applied to three-phase transformers where a single high-voltage bushing is provided for each phase. Also, it will be clear that adapter 10 may be formed from two portions 12 and 14 welded together rather than cast as an integral member.

While there has been shown and described the present preferred embodiment of this invention, it will be apparent to those skilled in the art that various modifications may be made without departing from the spirit and scope of this invention.

What is claimed as new and which it is desired to secure by Letters Patent of the United States is:

1. A bushing adapter for the high-voltage bushing of a pad-mounted transformer comprising:
   a conductive member having an upper first portion in one vertical plane and a lower second portion in another vertical plane at a right angle to said one vertical plane; said first portion having slatted connecting means to connect said first portion to the cable connector of a bushing;
   said second portion having slotted connecting means at opposite ends for receiving cable connectors.

2. A bushing and adapter for a pad-mounted transformer comprising in combination:
   a horizontally mounted bushing having one end connected to a wall member, the other end of said bushing having a cable connector;
   an adapter of conducting material having a first upper portion in one vertical plane and a second lower portion in another vertical plane at a right angle to said one vertical plane;
   connection means on said first vertical member connected to said cable connector, whereby said second vertical portion lies below said bushing; and cable-connecting means at opposite ends of said second vertical portion.

3. A bushing and adapter for a pad-mounted transformer as set forth in claim 2 in which said cable-connecting means comprises slots at opposite ends of said second vertical member and including locking means formed on said second vertical member, one locking means at the inside edge of each of said slots.